Patented Sept. 24, 1946

2,408,007

UNITED STATES PATENT OFFICE 2,408,007

METHOD FOR RECOVERY OF LOW-TEMPERATURE POLYMERIZATION PRODUCTS

Robert M. Thomas, Union, and Donald C. Field, Linden, N. J., assignors, by mesne assignments, to Jasco, Incorporated, a corporation of Louisiana No Drawing. Application August 30, 1941, Serial No. 408,994

9 Claims. (Cl. 260—93)

This application relates to polymeric materials; relates particularly to processes for the production of high quality olefinic polymers and interpolymers; and relates especially to methods for purifying the polymer and interpolymer, and simultaneously quenching and removing the catalyst from the polymer.

In prior processes for the making of high molecular weight olefinic polymers and interpolymers, such as polyisobutylene and the interpolymers of isobutylene with a diolefin, the reaction, during the latter stages as conducted at low temperatures, yields a mixture composed of the refrigerant, usually liquid ethylene, or solid carbon dioxide, with a substantial quantity of methyl chloride, portions of unreacted iso-olefin and diolefin, together with excess aluminum chloride, or other catalyst, and the solid polymer in the form of chunks or aggregate. This mixture is at the reaction temperature as set by the refrigerant, and it is necessary to separate the solid polymer from the other components of this mixture.

It is known that the molecular weight of the polymer produced by the reaction is an inverse function of the temperature, that is, the lower the temperature, the higher the molecular weight. Furthermore, it is fund that if the reaction mixture is allowed to warm up to room temperature to remove the volatile constituents, polymerization of the remaining reactants continues, under the influence of the residual and excess catalyst during the warming up. But a polymer of much lower molecular weight is produced at the higher temperature during the warming up; which polymer has different characteristics from the low temperature polymer and is exceedingly difficult to remove from the desired polymer; yet, if left in, it is exceedingly harmful, or even fatal, to the desired characteristics of the low temperature polymer.

In the prior art, it has been the practice to "quench" the residual catalyst by the addition of small amounts of alcohol or other hydroxy or oxygenated liquids to the cold polymerization mixture when the desired stage in the reaction is reached, before the mixture is allowed to warm up. It is found that this procedure destroys the excess catalyst in the liquid portion of the mixture, but it does not affect those portions of the catalyst which are occluded in the solid polymer. This residual catalyst is still active, and, since the olefinic reactants are soluble in the solid polymers, it promotes an undesirable polymerization reaction of the reactants which are dissolved in the solid polymer to yield further harmful material. Also, the occluded catalyst has harmful and destructive effects upon the solid polymer, and it appears to be a contributing factor in the deterioration of the material during storage, upon milling and upon heating, and to be a contributing factor in the formation of blisters and vacuoles in the interpolymer material upon curing.

The present invention provides a new and useful combination of steps for the processing of low temperature polymerizates to produce the solid polymer or interpolymer in the form of a fine grained slurry; to halt the polymerization reaction at a desired stage; to purify the polymer or interpolymer; and to improve its physical and chemical characteristics during storage, during heating and during mechanical working or milling.

Broadly, the present invention consists of the steps of preparing a reactant mixture of the desired olefinic material at the desired low temperature, the material being preferably isobutylene, or other low molecular weight iso-olefin, either with or without a diolefin such as butadiene, isoprene, pentadiene-1,3; 2,3-dimethyl-1,3 butadiene 2-methyl 3-butyl 1,3-butadiene, or with cyclopentadiene, or non-conjugated diolefins such as 2-methyl hexadiene-1,5; 2,6-dimethyl hexadiene-1,5, 2,6-dimethyl-4-methylene 2,5-heptadiene or triolefins such as hexatriene, myrcene, 1,6-dimethyl heptatriene 1-3-5 and 2,4,6-trimethyl 1,3,5-heptatriene or the like; and cooling the mixture to a temperature ranging from $-10°$ to $-100°$ or $-150°$ C. To this mixture, there is then added a Friedel-Crafts type active halide catalyst; which may be boron fluoride or may be aluminum chloride in solution in an inert low freezing solvent or may be other similar catalyst materials. This polymerization reaction is conducted under conditions to give a finely pulverulent form of polymer or interpolymer particle, which is highly desirable in order to permit the maximum speed of solution of the solid polymer in subsequent processes. When the polymerization reaction has reached the desired stage of completion, the whole reaction mixture is discharged into an excess of solvent, such as petroleum naphtha containing a small percentage of oxygenated compound, such as alkali, water, ammonia, an ether, an organic acid, or preferably a low molecular weight alcohol. The naphtha or other solvent material is provided in sufficient excess to insure solution of the entire quantity of polymer or interpolymer and sufficient alcohol is present to react with and destroy all of the catalyst. This solution is then preferably washed with water to remove the hydrolytic products arising from quenching the catalyst, and to free the polymer or interpolymer of practically all inorganic materials. The solid polymer or interpolymer is then recovered from solution by any one of several methods. It may be precipitated from the solution by the addition of appropriate quantities of oxygenated solvent, such as an alcohol, ether, aldehyde, organic acid or the like, either all at once, or in steps, to effect a fractionation of the solid polymer or interpolymer; or the naphtha solution may be heated at ordinary or reduced pressure and the naphtha flashed off from the solid polymer or interpolymer by releasing the pressure at an elevated temperature, or the solution may be sprayed into a polar liquid maintained at a temperature above the boiling point of the solvent; or the solution may be emulsified in water in the presence of suitable emulsifying agents, and if desired, the solvent volatilized from the water emulsion by appropriate heating while retaining the solid polymer or interpolymer in emulsion form for later use.

Thus an object of the invention is to produce, by low temperature polymerization, an olefinic polymer and olefinic-polyolefinic interpolymer of improved quality by modifying the steps used in quenching the catalyst, by removal of the catalyst and catalyst breakdown products; and in case of the interpolymers which are capable of being vulcanized, to free the interpolymer from the troublesome effects of blister-producing agents. Other objects and details of the invention will be apparent from the following description.

In practicing the invention, an olefinic mixture is prepared, preferably containing isobutylene in the proportion of 70 to 99 parts with a polyolefin, preferably a conjugated diolefin, in the proportion of 30 parts to 1 part, the diolefin preferably being butadiene or isoprene or pentadiene-1, 3 or 2,3-dimethyl butadiene-1,3 or other low molecular weight similar conjugated diolefin having from four to eight carbon atoms per molecule or other non-conjugated diolefin, triolefin or polyolefin previously mentioned. This mixture is then cooled to a low temperature, below $-50°$ C. to $-100°$ or $-150°$ C. by mixing therewith a suitable diluent-refrigerant such as liquid ethylene, liquid methane, liquid ethane, liquid propane or admixtures of these several substances; or the olefinic or olefinic-polyolefinic mixture may be cooled to a temperature of $-78°$ C. by the addition thereto of an excess of solid carbon dioxide, either with or without a diluent such as the low-freezing alkyl halides, liquid propane or other similar inert diluents, or external cooling may be employed with or without a diluent.

To the cooled olefinic mixture, there is then added a Friedel Crafts type active halide catalyst, which may be boron trifluoride, or with the iso-olefinic-polyolefinic mixture is preferably a solution of aluminum chloride in an alkyl halide such as ethyl or methyl chloride or in carbon disulfide, or in other low freezing, inert solvent. The aluminum chloride is desirably present in the solution in the proportion of from 0.5% to 5 or 6%, and is preferably sprayed as fine droplets on to the surface of the rapidly stirred olefinic mixture or introduced in a suitably dilute concentration below the liquid level of the reaction mixture with intense agitation.

The polymerization reaction proceeds rapidly to yield a high molecular weight polymer of isobutylene or interpolymer of the iso-olefin with the polyolefin, which latter is characterized by a molecular weight ranging from 15,000 to 150,000, or higher; by an iodine number ranging from 1 to 40 or 50, preferably between 1 and 9; and the property of reactivity with sulfur to yield a curing reaction. It is usually desirable to halt the reaction short of 100% polymerization, the preferable yield being from 60% to 80%.

This polymerization reaction is, as above pointed out, conducted with the conditions adjusted in such manner as to obtain a slurry of the smallest possible particle size of solid polymer or interpolymer in the reaction mixture. A considerable number of factors are involved in obtaining the fine particle size in the slurry which is desirable for maximum speed of solution of the polymer in the solvent.

The first of these factors is the quantity of diluent or diluent refrigerant. Ordinarily, the polymerization reaction has been conducted with 1 or 2 volumes of diluent-refrigerant per volume of polymerizable olefinic or olefinic-polyolefinic material. In order to obtain reasonably small particle size in the slurry, it is essential under conditions of limited agitation that more than 2 volumes of diluent per volume of reactant be present; and even larger quantities, up to 4 or 5 volumes of diluent per volume of reactant, are sometimes preferable.

Secondly, it is desirable that the diluent or diluent-refrigrant have as low a solubility for the solid polymer or interpolymer as possible and as low a solubility in the solid polymer as possible, in order to minimize the softening effect of the diluent upon the particles, thereby reducing the tendency towards cohesion of the particles to a minimum value. For this purpose, liquid ethylene has a satisfactorily low solubility factor.

Thirdly, the temperature of the mixture is an important item. At temperatures below about $-80°$ C. and in the absence of plasticizing materials, the polymer or interpolymer particles are hard and sandy in character and do not cohere, but at temperatures above about $-75°$ C., the particles are rubber-like and show a strong tendency to cohere and agglomerate. This effect is well shown by the fact that when solid carbon dioxide is used as an external refrigerant, the temperatures in the reaction liquid may go no higher than $-70°$ C. Nevertheless, the particles agglomerate into large, solid masses; yet if the solid carbon dioxide is added to the reaction mixture for internal cooling, it appears that a substantial portion of the solid carbon dioxide dissolves in the reaction mixture to decrease the solubility of the polymer in the medium, and while the reaction temperature may be close to $-70°$ C., the particles do not cohere or agglomerate.

Fourthly, maximum rapidity of stirring is helpful in securing and maintaining fine particle size, in part because of the rapid incorporation of the catalyst solution in fine particle form, and in part by the mechanical prevention of agglomeration of particles when the cohesive tendency is small.

Fifthly, it is desirable that the catalyst solution be added by distribution from a spray nozzle onto the rapidly stirred surface of the polymerization mixture, or that the catalyst be introduced in a small stream into the reaction mixture under conditions of maximum turbulence of stirring.

Sixthly, the maintenance of the fine particle condition is facilitated by addition agents, such as stearic acid and zinc stearate. The exact method of operation of these addition agents is unknown, but their presence is found to be helpful in the maintenance of the fine particle size in the slurry.

Example 1

An olefinic mixture was prepared and polymerized as indicated above, and when the desired polymerization stage was reached, the polymerization mixture at the low polymerization temperature was discharged quickly into about one and one-half volumes of 54-solvent naphtha at a temperature of about 70° C. (although carbon tetrachloride or propyl chloride or other convenient solvents could have been used). The solvent contained about 1% of isopropyl alcohol. The polymerization mixture contained residual ethylene, contained residual quantities of the isobutylene and of the diolefin and substantial quantities of the catalyst. Immediately upon discharge of the polymerization mixture into the solvent, the solid polymer, present in the polymerization mixture as fine particles, obtained as above described, dissolved. Simultaneously, the catalyst, both that remaining in the liquid portion of the mixture and that occluded in the solid particles, was quenched and converted into non-catalytic compounds by the alcohol. Simultaneously, the diluent-refrigerant was volatilized by the sensible heat of the naphtha and was recovered in the gaseous form. The solution having been cooled by the refrigerant was then warmed to room temperature.

The interpolymer solution was then washed with water. This washing step removed the catalyst quenching agent and with it, the catalyst breakdown products, thereby freeing the solid interpolymer from catalyst, both the catalyst in the reaction mixture which upon warming would have yielded undesirably low molecular weight interpolymers, and the catalyst occluded in the solid interpolymer which, while it would not cause undesirable polymerization reactions, would have injured the interpolymer by causing molecular weight breakdown during storage and would have interfered with the curing operation.

Example 2

The solution of interpolymer obtained from Example 1, substantially free from catalyst and catalyst breakdown products, was treated with an excess of a precipitant in the form of isopropyl alcohol, approximately 1 volume of isopropyl alcohol being added to 4 volumes of the interpolymer solution. Nearly all of the solid interpolymer was thereby precipitated from the solution in a highly advantageous form for further compounding; and also substantially free from low molecular weight interpolymers which would interfere with the compounding, and free from interfering catalyst or catalyst breakdown products.

This material was compounded according to a formula requiring:

| | Parts |
|---|---|
| Interpolymer | 100 |
| Carbon black | 50 |
| Zinc oxide | 5 |
| Stearic acid | 5 |
| Tuads (tetramethyl thiuram disulfide) | 1 |

This compound was prepared by working the interpolymer on the roll mill and adding the various additional components to the material on the mill, cutting the sheet of compound back and forth across the mill.

The compounded material was then placed in a mold and cured at a temperature of approximately 155° C. for a time interval of 30 minutes, at the end of which time it was found to be fully cured and to have a tensile strength of about 4400 pounds per square inch, a value substantially above that obtainable by the prior processing methods.

Example 3

A quantity of the interpolymer solution as obtained in Example 1 was placed in a closed bomb and brought up to a temperature of approximately 175° C. and then discharged through a nozzle valve into a closed receptacle having an outlet for the recovery of the volatilized solvent. The solid interpolymer fell to the bottom of the receptacle and was collected therefrom, small residual quantities of the volatile solvent being removed by heating the interpolymer in a current of warm air.

This interpolymer was compounded in a formula similar to that shown in Example 2, and gave a similarly highly cured material of similar tensile strength.

Example 4

The purified interpolymer solution of Example 1 is particularly advantageous for the preparation of emulsions which are particularly easily prepared and particularly stable, because of the absence of the tendency toward precipitation produced by residual traces of catalyst which remain in the interpolymer when other methods of purification are applied.

In preparing the emulsion of this example, approximately two parts of an emulsifying agent in the form of triethanol amine oleate per 100 parts of solid polymer were added to the polymer solution and the polymer solution with the emulsifying agent was added to approximately one volume of water while stirring vigorously. The polymer solution formed a highly dispersed emulsion in which the particles of polymer solution were of very small size. The emulsion was then warmed with vigorous stirring and the volatile solvent volatilized out of the emulsion, leaving an emulsion of the solid particles of polymer in a condition of extremely fine dispersion.

Example 5

A quantity of the emulsion of interpolymer solution in water as prepared in Example 4 was placed in a closed bomb and brought up to an elevated temperature well above the boiling point of the volatile hydrocarbon solvent. The heated emulsion was then discharged through a nozzle valve into a receptacle, equipped with an outlet for the recovery of the volatile solvent. Substantially all of the volatile solvent and a portion of water were volatilized by this procedure, leaving in the receptacle an emulsion of exceedingly fine grained particles of the interpolymer in water.

Example 6

This procedure is applicable to the simple polymers of an iso-olefin as well as to the interpolymers of iso-olefin-diolefin and iso-olefin-polyolefin.

A mixture of isobutylene with ethyl chloride as a diluent; and solid powdered carbon dioxide snow (dry ice) was prepared, and treated with boron trifluoride catalyst with attention to the above described details for obtaining a fine particle slurry. The resulting polymer had a molecular weight of approximately 150,000; had an iodine number too low to measure, and had the characteristics of a rubbery, elastic body.

This material was discharged from the reaction vessel into petroleum naphtha, the petroleum naphtha containing approximately 2% of isopropyl alcohol. The particles of polymer dissolved readily, and the isopropyl alcohol quenched the boron trifluoride catalyst, both that in the unpolymerized isobutylene and that occluded in the solid polymer. The solution was then brought up to room temperature and washed to remove the catalyst breakdown products and other interfering materials, as in Example 1, and the unpolymerized isobutylene volatilized out.

This polymer likewise is readily recovered by precipitation, as in Example 2, or by flashing off the solvent as in Example 3. It likewise is a highly desirable material for the preparation of emulsions as in Examples 4 and 5.

Thus the invention consists of the steps, in combination, of polymerizing olefinic or olefinic-polyolefinic material at low temperature, dissolving the polymer or interpolymer at low temperature in a hydrocarbon solvent containing a catalyst quenching agent, washing the solution and recovering the polymer or interpolymer in solid form therefrom, either as a solid polymer or interpolymer or as a polymer or interpolymer emulsion.

In the above examples and throughout this specification and the appended claims, wherever the term "olefinic material" is used, it refers to iso-olefins such as isobutylene or to polyolefins such as butadiene, isoprene, pentadiene-1,3; 2-methyl hexadiene-1,5; myrcene, hexatriene or any other monoolefins or polyolefins or homologs thereof capable of interpolymerization with an iso-olefin.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. Process for preparing improved polymerization products comprising polymerizing at a temperature between −50° C. and −150° C. a mixture containing from 70 to 99 parts of isobutylene and from 30 to 1 parts of a conjugated diolefin of 4 to 8 carbon atoms per molecule in the presence of a catalyst solution of aluminum chloride dissolved in an inert solvent which is liquid at the reaction temperature to form a solid polymer product containing occluded catalyst therein, then bringing this solid polymer product without substantial rise in temperature into contact with a volatile hydrocarbon solvent containing an alcoholic catalyst quenching agent, thereby dissolving the said polymer in said solvent and destroying the activity of the said occluded catalyst, then washing the polymer solution to remove the aluminum compounds present therein.

2. Process according to claim 1 in which the said solid polymer product is in the form of a slurry of separate particles dispersed in the reaction mixture.

3. The process for preparing improved polymerization products comprising the steps of polymerizing at a temperature between −50° C. and −150° C., a mixture containing from 70 to 99 parts of isobutylene with from 30 to 1 parts of butadiene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent and thereafter washing the polymer solution to remove the aluminum compounds present therein.

4. The process for preparing improved polymerization products comprising the steps of polymerizing at a temperature between −50° C. and −150° C., a mixture containing from 70 to 99 parts of isobutylene with from 30 to 1 parts of isoprene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent and thereafter washing the polymer solution to remove the aluminum compounds present therein.

5. The process for preparing improved polymerization products comprising the steps of polymerizing at a temperature between −50° C. and −150° C., a mixture containing from 70 to 99 parts of isobutylene with from 30 to 1 parts of dimethyl butadiene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent and thereafter washing the polymer solution to remove the aluminum compounds present therein.

6. The process for preparing improved polymerization products comprising the steps of polymerizing at a temperature between −50° C. and −150° C., a mixture containing from 70 to 99 parts of isobutylene with from 30 to 1 parts of butadiene by the application thereto of a catalyst solution of aluminum chloride dissolved in ethyl chloride, to form a solid polymer product in suspension in a residual portion of polymerization mixture, then bringing the suspension of solid product, without substantial rise in temperature into contact with a volatile hydrocarbon solvent, thereby dissolving the said polymer in said solvent and thereafter washing the polymer solution to remove the aluminum compounds present therein.

7. The process for preparing improved polymerization products comprising the steps of polymerizing at a temperature between −50° C. and −150° C., a mixture containing from 70 to 99 parts of isobutylene with from 30 to 1 parts of butadiene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent, washing the polymer solution to remove the aluminum compounds present therein, and thereafter precipitating a solid polymer from the solution by the addition to the solution of a substantial portion of an alcohol.

8. The process of preparing improved polymerization products comprising the steps of polymerizing at a temperature between —50° C. and —150° C., a mixture containing from 70 to 99 parts of isobutylene with from 30 to 1 parts of butadiene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent, washing the polymer solution to remove the aluminum compounds present therein and thereafter volatilizing out the solvent from the polymer.

9. The process for preparing improved polymerization products comprising the steps of polymerizing at a temperature between —50° C. and —150° C., a mixture containing from 70 to 99 parts of isobutylene with from 30 to 1 parts of butadiene by the application thereto of a catalyst solution of aluminum chloride dissolved in an inert solvent which is liquid at the reaction temperature, to form a solid polymer product in suspension in a residual portion of polymerization mixture, then bringing the suspension of solid product, without substantial rise in temperature into contact with a volatile hydrocarbon solvent, thereby dissolving the said polymer in said solvent, washing the polymer solution to remove the aluminum compounds present therein, and thereafter precipitating a solid polymer from the solution by the addition to the solution of a substantial portion of an alcohol, the said alcohol being added in steps to obtain a fractional precipitation.

ROBERT M. THOMAS.
DONALD C. FIELD.